June 24, 1947.                J. KATINOS, JR                2,422,910
                         APPARATUS FOR LOADING TRUCKS
                          Filed April 9, 1945            2 Sheets-Sheet 2
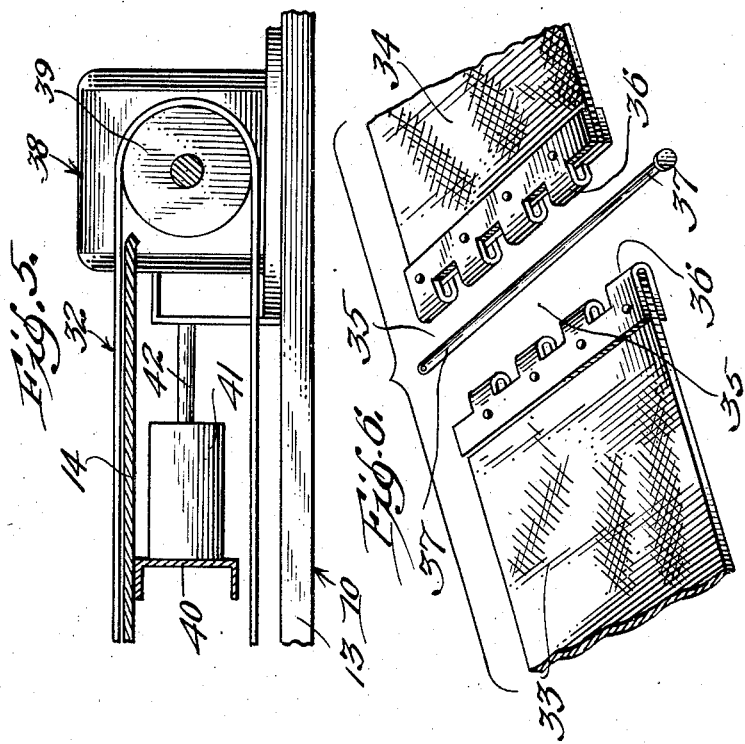
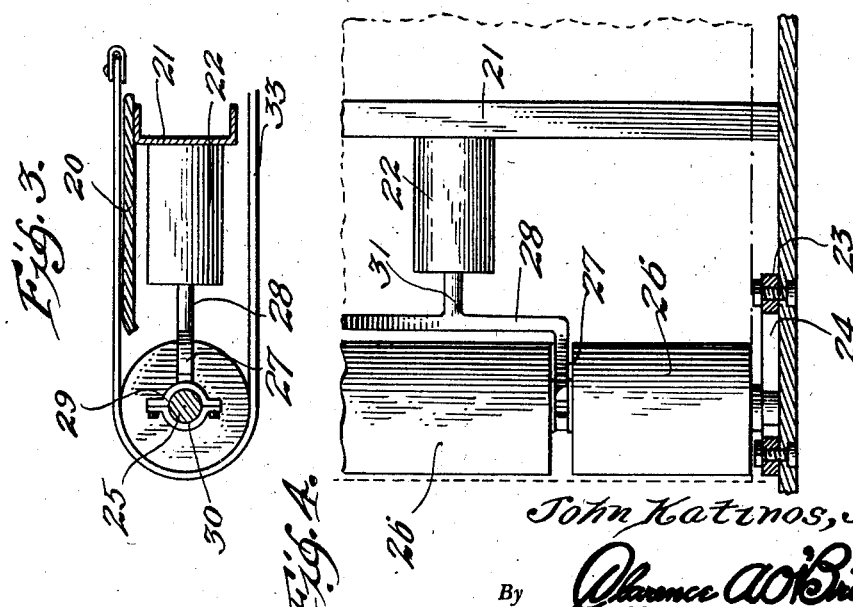
Inventor
John Katinos, Jr.
By Clarence A. O'Brien
and Harvey B. Jacobson
Attorneys Patented June 24, 1947

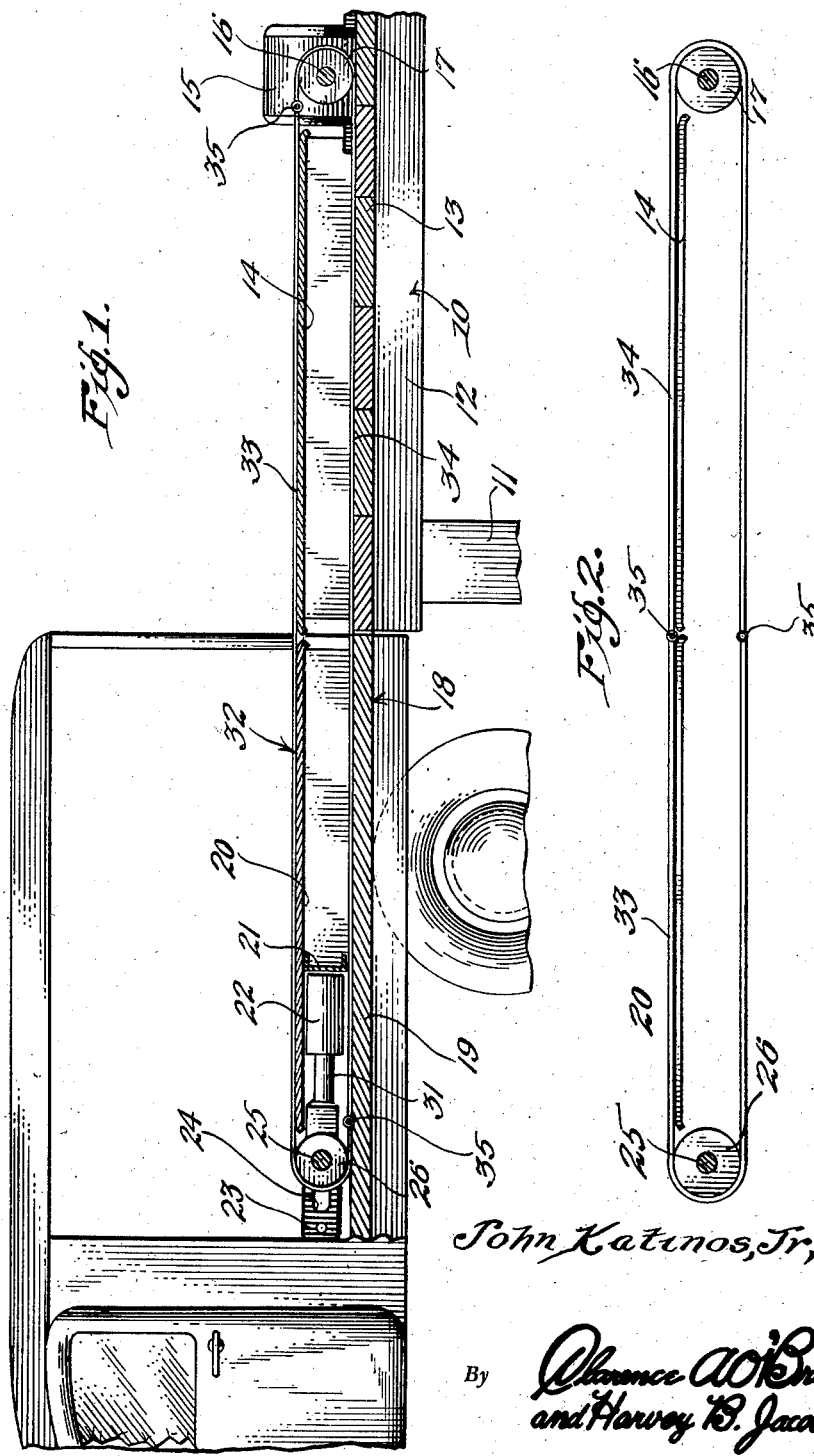

2,422,910

UNITED STATES PATENT OFFICE 2,422,910

APPARATUS FOR LOADING TRUCKS

John Katinos, Jr., Oakmont, Pa.

Application April 9, 1945, Serial No. 587,361

10 Claims. (Cl. 214—38)

1

This invention relates to apparatus for loading trucks and has for its primary object the simplification of truck loading and to avoid the necessity of carrying individual packages into a truck.

Another object is to enable a complete load to be disposed upon a conveyor and subsequently moving the load in its entirety to a position within the truck body.

The above and other objects may be attained by employing this invention which embodies among its features a conveyor, one supporting unit of which is carried by the truck while the opposite supporting unit is carried by the loading platform and two separate conveyor belt sections of equal length disposed about the conveyor supporting elements and detachably connected together at opposite ends.

Other features embody means on the loading platform for driving the conveyor belt support both in a forward and reverse direction, and means associated with the conveyor belt support within the truck body for releasing the tension on the belt once the load has been disposed within the truck body.

In the drawings:

Figure 1 is a longitudinal sectional view through a truck body and loading platform showing my conveyor equipment mounted thereon.

Figure 2 is a diagrammatic view similar to Figure 1 showing the belt sections moved in such position that the load is disposed within the truck body.

Figure 3 is an enlarged fragmentary sectional view through the conveyor supporting device employed within the truck body.

Figure 4 is a fragmentary top plan view thereof.

Figure 5 is an enlarged fragmentary view of the conveyor support which is mounted on the loading platform illustrating a modified form of belt tensioning device.

Figure 6 is a fragmentary expanded view showing in detail the manner in which the belt ends are detachably connected together.

Referring to the drawings in detail a loading platform designated generally 10 comprising the usual columns 11 and stringers 12 upon which a floor 13 is supported carries on its upper side in spaced relation thereto a sub-platform 14 which serves as a support for the conveyor belt and load to be more fully hereinafter described.

Secured to the platform 13 is a suitable power unit 15 to the shaft 16 of which is connected a conveyor supporting roller 17 the upper portion of which lies in a plane with the upper surface of the sub-platform 14.

2

Carried by a truck designated generally 18 is the usual truck floor 19 having spaced upwardly therefrom a sub-floor 20 which as shown in Figure 1 is adapted to align with the sub-platform 14 of the loading platform 10. Extending transversely of the truck between the floor 19 and sub-floor 20 is a channel 21 forming a support for one or more hydraulic cylinders 22, and supported at opposite sides of the truck midway between the floor 19 and sub-floor 20 but at the forward end thereof, that is, adjacent the cab of the truck are longitudinally slotted brackets 23 in the slots 24 of which the ends of a transversely extending shaft 25 are adapted to rotate. Mounted at spaced intervals on the shaft 25 are conveyor supporting rollers 26 between which the tines 27 of a forked member 28 project for engagement with the shaft 25 as shown in Figure 3. The ends of the tines 27 are fitted with bearings 29 which are secured about the shaft 25 by means of bearing caps 30. The forked member 28 is provided midway of its ends with a piston rod 31 the piston of which operates within the hydraulic cylinder 22 previously described. It will thus be seen that the shaft 25 and the rollers 26 may be moved longitudinally of the truck body in a horizontal direction. Mounted on the rollers 17 and 26 is a conveyor designated generally 32 which comprises two separate belt halves 33 and 34 of equal length the ends of which are joined at 35 by suitable hinge barrels 36 (Figure 6) which are adapted to be interconnected by a hinge pin 37.

In the modified form of the invention illustrated in Figure 5 the power unit designated generally 38 which corresponds to the power unit 15 previously described and the belt driving cylinder 39 associated therewith are mounted on the platform 10 to move longitudinally of the belt. Supported between the sub-platform 14 and the floor 13 of the platform 10 and extending transversely of the belt is a channel 40 supporting a hydraulic cylinder 41 the piston rod 42 of which is connected to the power unit 38 so as to move it longitudinally with relation to the belt 32. When this type of power unit mounting is employed the roller over which the belt runs and which is carried by the truck body is held against longitudinal movement with relation to the belt and the belt tightening and loosening function is controlled solely by the movements of the piston of a hydraulic cylinder 41.

In operation, the truck is backed into position adjacent the platform as shown in Figure 1 at which time the hinge pins 37 are projected through the hinge barrels 36 at the junctions 35 of the belt sections 33 and 34. The motor 15 is then reversed so as to move the junctions 35 of the top run of the belt back toward the power unit into the position shown in Figure 1 from the position shown in Figure 2. Such movement will cause the junction 35 of the lower run of the belt to move toward the front end of the truck into the position shown in Figure 1 from the position shown in Figure 2. The belt is then tightened by operation of the hydraulic cylinder 22 to cause the rollers 26 to advance toward the front end of the truck and the rear half of the belt section 33 is then loaded with the articles that are to be transferred to the truck. Upon completing the loading of the belt section 33 which is at that time supported on the sub-platform 14 the motor 15 is operated to drive the belt in a forward direction so as to move the belt section 33 and the load imposed thereon into the truck body so that the load rests upon the sub-floor 29 within the truck. Such movement causes the junctions 35 to return to their initial position as shown in Figure 2 and the hydraulic cylinder 22 is then operated to retract the piston and the attendant mechanism including the supporting rollers 26 so as to relieve the belt of tension. Under these conditions the hinge pins 27 may be readily withdrawn from the hinge barrels 36 at the belt junctions 35 and the two belt sections 33 and 34 may then be wholly disconnected. In this condition the truck is free to move about to discharge the load and upon its return the belt sections are in position to be again connected for a reloading operation following the procedure just described.

While in the foregoing there has been shown and described the preferred embodiment of this invention it is to be understood that minor changes in the details of construction, combination, and arrangement of parts may be resorted to without departing from the spirit and scope of the invention as claimed.

Having thus described the invention, what I claim is:

1. In a truck loader, a belt conveyor supporting element within the body of a truck, a belt conveyor supporting element wholly outside of the truck body, a two part conveyor belt adapted to run over the conveyor supports, detachable means joining the two parts of the belt together at opposite ends and means for driving the conveyor belt as a unit when the parts thereof are joined.

2. In a truck loader, a belt conveyor supporting element within the body of a truck, a belt conveyor supporting element wholly outside of the truck body, a two part conveyor belt adapted to run over the conveyor supports, detachable means joining the two parts of the belt together at opposite ends, means for driving the belt as a unit when the parts thereof are joined and means to release the tension on the belt during the operation of the detachable means.

3. In a truck loader, a belt conveyor supporting element within the body of a truck, a belt conveyor supporting element wholly outside of the truck body, a two part conveyor belt adapted to run over the conveyor supports, detachable means joining the two parts of the belt together at opposite ends, means for driving the belts as a unit when the parts thereof are joined and hydraulically operated means to release the tension on the belt during the operation of the detachable means.

4. In a truck loader, a belt conveyor supporting element within the body of a truck, a belt conveyor supporting element wholly outside of the truck body, a two part conveyor belt adapted to run over the conveyor supports, detachable means joining the two parts of the belt together at opposite ends and means wholly outside of the truck for driving the conveyor belt as a unit when the parts thereof are joined.

5. In a truck loader, a belt conveyor supporting element within the body of a truck, a belt conveyor supporting element wholly outside of the truck body, a two part conveyor belt adapted to run over the conveyor supports, detachable means joining the two parts of the belt together at opposite ends, means for driving the conveyor belt as a unit when the parts thereof are joined and means carried by the truck to release the tension on the belt during the operation of the detachable means.

6. In a truck loader, a belt conveyor supporting element within the body of a truck, a belt conveyor supporting element wholly outside of the truck body, a two part conveyor belt adapted to run over the conveyor supports, detachable means joining the two parts of the belt together at opposite ends, means wholly outside of the truck for driving the conveyor belt as a unit when the parts thereof are joined and means carried by the truck to release the tension on the belt during the operation of the detachable means.

7. In a truck loader, a belt conveyor supporting element within the body of a truck, a belt conveyor supporting element wholly outside of the truck body, a two part conveyor belt adapted to run over the conveyor supports, interdigitating hinge barrels carried by opposite ends of the belt parts, hinge pins adapted to enter the hinge barrels for joining the two parts of the belt together at opposite ends and means for driving the conveyor belt as a unit when the parts thereof are so joined.

8. In a truck loader, a belt conveyor supporting element within the body of a truck, a belt conveyor supporting element wholly outside of the truck body, a two part conveyor belt adapted to run over the conveyor supports, interdigitating hinge barrels carried by opposite ends of the belt parts, hinge pins adapted to enter the hinge barrels for joining the two parts of the belt together at opposite ends, means for driving the conveyor belt as a unit when the parts thereof are so joined and means to release the tension on the belt during the insertion or extraction of the hinge pins with relation to the barrels.

9. In a truck loader, a belt conveyor supporting element within the body of a truck, a belt conveyor supporting element wholly outside of the truck body, a two part conveyor belt adapted to run over the conveyor supports, interdigitating hinge barrels carried by opposite ends of the belt parts, hinge pins adapted to enter the hinge barrels for joining the two parts of the belt together at opposite ends, means for driving the conveyor belt as a unit when the parts thereof are so joined, means to release the tension on the belt during the insertion or extraction of the hinge pins with relation to the barrels and means wholly outside of the truck for driving the conveyor belt as a unit when the parts thereof are so joined.

10. In a truck loader, a belt conveyor supporting element within the body of a truck, a belt conveyor supporting element wholly outside of the truck body, a two part conveyor belt adapted to run over the conveyor supports, interdigitating hinge barrels carried by opposite ends of the belt parts, hinge pins adapted to enter the hinge barrels for joining the two parts of the belt together at opposite ends, means for driving the conveyor belt as a unit when the parts thereof are so joined, means to release the tension on the belt during the insertion or extraction of the hinge pins with relation to the barrels, means wholly outside of the truck for driving the conveyor belt as a unit when the parts thereof are so joined and means carried by the truck for releasing the tension on the belt during the insertion or extraction of the hinge pins with relation to the barrels.

JOHN KATINOS, Jr.

REFERENCES CITED

The following references are of record in the file of this patent:

UNITED STATES PATENTS

| Number | Name | Date |
|---|---|---|
| 2,087,846 | Jahn | July 20, 1937 |
| 2,188,374 | Sanchez | Jan. 30, 1940 |
| 596,322 | Carpenter | Dec. 28, 1897 |
| 1,237,834 | Stamper | Aug. 21, 1917 |
| 1,830,740 | Leech et al. | Nov. 3, 1931 |
| 2,165,641 | Mattox | July 11, 1939 |